United States Patent [19]

Burke

[11] 4,245,015

[45] Jan. 13, 1981

[54] ELECTROLYTE FOR LEAD PLATE STORAGE BATTERY

[76] Inventor: Dallas Burke, 5046 Bonwell Dr., Concord, Calif. 94521

[21] Appl. No.: 68,099

[22] Filed: Aug. 20, 1979

[51] Int. Cl.³ ............................................. H01M 6/04
[52] U.S. Cl. ................................... 429/188; 429/199
[58] Field of Search ............... 429/188, 204, 199, 205; 252/62.2, 518, 519; 423/508

[56] References Cited

U.S. PATENT DOCUMENTS

| | | | |
|---|---|---|---|
| 1,722,343 | 7/1929 | Schmaus | 429/195 |
| 1,941,494 | 1/1934 | Ruben | 429/188 X |
| 2,715,081 | 8/1955 | Gritman et al. | 429/204 X |
| 2,715,082 | 8/1955 | Gritman et al. | 429/204 X |
| 2,715,148 | 8/1955 | Gritman et al. | 429/204 X |
| 2,841,632 | 7/1958 | Macholl et al. | 429/204 |
| 2,948,767 | 8/1960 | Johnson et al. | 429/188 X |

OTHER PUBLICATIONS

Handbook of Chem. & Physics, 57th Ed., 1976–1977, p. B-153.

*Primary Examiner*—Charles F. LeFevour
*Attorney, Agent, or Firm*—Bruce & McCoy

[57] ABSTRACT

An electrolyte for lead plate storage battery comprising selenic acid ($H_2SeO_4$) in aqueous solution at concentrations ranging from approximately 0.3 grams to approximately 4.0 grams of selenic acid per liter of electrolyte; the preferred embodiment of said electrolyte containing additional material selected from the group consisting of ferrous sulfate ($FeSO_4$) at concentrations ranging from approximately 0.1 grams to approximately 8.0 grams per liter of electrolyte, sodium chloride (NaCl) at concentrations ranging from approximately 0.1 grams to approximately 4.0 grams per liter of electrolyte, and manganous sulfate ($MnSO_4$) at concentrations ranging from approximately 0.005 grams to approximately 0.1 grams per liter of electrolyte.

3 Claims, No Drawings

ELECTROLYTE FOR LEAD PLATE STORAGE BATTERY

BACKGROUND OF THE INVENTION

1. Field of the Invention

The present invention relates to lead plate storage batteries and more particularly to electrolytes therefore.

Description of the Prior Art

The lead plate storage battery using sulfuric acid as the electrolyte is by far the most common rechargeable battery in use in the world today. The present invention is a new electrolyte which is alternative to the sulfuric acid electrolyte presently used in the lead plate storage battery. Prior patents for electrolytes such as U.S. Letters Pat. No. 1,722,343, for LIQUID FOR ACCUMULATORS, issued July 30, 1929, to G. Schmaus, and U.S. Letters Pat. No. 2,841,632 for ELECTROLYTE ADDITIVE FOR STORAGE BATTERIES, issued July 1, 1958, to J. Macholl and Kenneth Patterson, describe various additives that may be utilized in conjunction with a sulfuric acid electrolyte to improve the performance of the battery.

The concentration of sulfuric acid conventionally used in batteries generally leads to corrosion problems and requires careful handling to avoid injury. The electrolyte of the present invention provides an alternative to sulfuric acid electrolytes because the concentraton of acid can be substantially reduced. This results in an electrolyte that is less corrosive to battery terminals and less dangerous to the user. The present invention also describes additives which improve the performance of the electrolyte by preventing the build up of lead selenate on the battery plates.

SUMMARY OF THE INVENTION

The present invention is an electrolyte for a lead plate storage battery comprising an aqueous solution of selenic acid at concentrations ranging from 0.3 grams to 0.4 grams of selenic acid per liter of electrolyte. In various embodiments of the invention, material from the group consisting of ferrous sulfate at concentrations ranging from approximately 0.1 grams to approximately 8.0 grams per liter of electrolyte, sodium chloride at concentrations ranging from approximately 0.1 grams to approximately 4.0 grams per liter of electrolyte, and manganous sulfate at concentrations ranging from approximately 0.005 grams to approximately 0.1 grams per liter of electrolyte may be added to the selenic acid electrolyte to improve its performance.

OBJECTS OF THE INVENTION

It is therefore an important object of the present invention to provide a new electrolyte for a lead plate storage battery.

It is another object of the present invention to provide an electrolyte having low corrosive effects.

It is a further object of the present invention to provide an electrolyte that is of a reduced danger to the user of the battery should spillage occur.

It is yet another object of the present invention to provide additives for the selenic acid electrolyte which improve the performance of the battery.

Other objects of the present invention will be apparent in the detailed description which follows.

DESCRIPTION OF THE PREFERRED EMBODIMENT

The present invention is an electrolyte which is to be used in the standard lead plate storage battery. Its essential component is selenic acid ($H_2SeO_4$) in aqueous solution. Further substances may be added thereto, as described hereinbelow, to improve the performance of the battery. Various amounts of selenic acid in aqueous solution have been examined for electrolytic properties and concentrations from approximately 0.3 grams per liter of solution to approximately 4.0 grams per liter of solution have been found to yield good battery performance. The best performance is achieved when the selenic acid concentration is approximately 0.38 grams per liter of solution. The desired concentration of selenic acid electrolyte can be made directly from the dilution of pure selenic acid in distilled water. Alternatively, selenious acid ($H_2SeO_3$) can be reacted with hydrogen peroxide to create selenic acid which can then be diluted to the desired concentration. Other methods of preparing the desired concentration of selenic acid will be obvious to those skilled in the art.

In the standard lead plate storage battery the cathode or positively charged plate is composed of lead peroxide ($PbO_2$), and the anode or negatively charged plate is composed of lead (Pb). The selenic acid electrolyte reaction in the battery may be represented by the following equations: At the positive plate:

$$PbO_2 + H_2SeO_4 \rightleftharpoons PbSeO_4 + H_2O + O$$

At the negative plate:

$$Pb + H_2SeO_4 \rightleftharpoons PbSeO_4 + 2H$$

The combined reactions at the positive and negative plates are:

$$PbO_2 + Pb + 2H_2SeO_4 \rightleftharpoons 2PbSeO_4 + 2H_2O.$$

These equations are to read left to right for discharging and right to left for charging of the battery.

It is seen from the above equations that a natural result of the discharging of the battery during use is the creation of lead selenate ($PbSeO_4$). With use, it has been found that the lead selenate can build up a hard surface film on the plates of the battery which inhibits the chemical reactions necessary for proper performance. To inhibit the build-up of selenates on the plates of the battery and thereby improve the performance of the battery, several chemical additives to the selenic acid electrolyte have proved effective.

One such substance is ferrous sulfate ($FeSO_4$) which, when added to the selenic acid electrolyte, acts to inhibit the depositing of unwanted lead selenate on the plates. Ranges of ferrous sulfate concentrations from approximately 0.1 grams per liter of electrolyte to approximately 8.0 grams per liter of electrolyte have been examined, with the greatest effectiveness appearing in concentrations of approximately 8.0 grams liter of electrolyte.

A second substance that has been found to be effective in improving the performance of the battery is sodium chloride (NaCl). Various concentrations of sodium chloride in the selenic acid electrolyte, from approximately 0.1 grams per liter of electrolyte to approximately 4.0 grams per liter of electrolyte have been examined. The most beneficial concentration appears to be approximately 0.46 grams per liter of electrolyte.

A third substance found to have been beneficial effect in the battery is manganous sulfate ($MnSO_4$). Various small concentrations of this substance, from approximately 0.005 grams per liter of electrolyte to approximately 0.1 grams per liter of electrolyte have been investigated, with the most efficacious concentration appearing to be approximately 0.01 grams per liter of electrolyte.

Experimentation with the above-mentioned three additives, ferrous sulfate, sodium chloride and manganous sulfate, has shown that utilization of the three additives together in an electrolyte has a more beneficial effect than any one of them used singularly. Thus, in the preferred embodiment of the invention, the electrolyte yielding the best performance comprises selenic acid in aqueous solution having a concentration of approximately 0.38 grams per liter of electrolyte with additives of ferrous sulfate in a concentration of approximately 0.8 grams per liter of electrolyte, plus sodium chloride in a concentration of approximately 0.46 grams per liter of electrolyte, plus manganous sulfate in concentration of approximately 0.01 grams per liter of electrolyte.

The electrolyte is used in lead plate storage batteries in the same manner as the presently standard sulfuric acid electrolyte. Thus, for batteries presently existing with a sulfuric acid electrolyte, the sulfuric acid electrolyte may be carefully poured out of the battery and the electrolyte of the present invention replaced therefor. Charging of the selenic acid battery is accomplished in the same manner as a standard sulfuric acid battery; that is, with the application of outside electrical energy to drive the above-described chemical equations in the direction of charging.

To determine the state of the charge in the battery of the present invention, use is made of the fact that the specific gravity of the electrolyte decreases as the battery discharges. Thus, as with sulfuric acid storage batteries, a hydrometer may be utilized to make a determination of the specific gravity of the electrolyte. However, as the specific gravity range of the selenic acid electrolyte is not within the range of the specific gravity of the standard sulfuric acid electrolyte, a hydrometer with a different scale must be utilized to make a determination. A fully charged selenic acid electrolyte battery, wherein the selenic acid has an initial concentration of approximately 0.38 grams per liter of electrolyte, will have a specific gravity of approximately 1.125. When the battery is fully discharged the selenic acid electrolyte will have a specific gravity of approximately 1.0.

The maximum concentration of selenic acid in the electrolyte, described herein as being up to 4.0 grams of selenic acid per liter of electrolyte, equates to a solution comprising approximately 250 parts of water to one part of selenic acid by weight. By comparison, a standard, fully charged, sulfuric acid battery, having a specific gravity of 1.260, has a concentration of approximately 1.70 parts of water to one part of sulfuric acid by weight. The selenic acid electrolyte is therefor a much weaker acid than a standard sulfuric acid electrolyte, and is less corrosive and less dangerous to the user than the standard sulfuric acid electrolyte.

From the foregoing description of the present invention it can be seen that it is an electrolyte comprised primarialy of selenic acid. It is obvious that the concentration of selenic acid in the electrolyte is sufficient to produce an effective electrolyte and yet one that is far less corrosive and dangerous than the typical sulfuric acid electrolyte in use today. The ferrous sulfate, sodium chloride and manganous sulfate additives described herein provide further effectiveness for the primary selenic acid electrolyte by alleviating undesired effects within the battery.

It will be seen from the foregoing description that the present invention will perform all of the objects attributable thereto. While it has been described in considerable detail, it is not limited to such detail except as necessitated by the appended claims.

I claim:

1. An electrolyte for a lead plate storage battery consisting essentially of a solution of water, selenic acid ($H_2SeO_4$) having a concentration in the range of approximately 0.3 grams to approximately 4.0 grams per liter of electrolyte and at least one material of the group consisting of ferrous sulfate ($FeSO_4$) having a concentration in the range of approximately 0.1 grams to approximately 8.0 grams per liter of electrolyte, sodium chloride (NaCl) having a concentration in the range of approximately 0.1 grams to approximately 4.0 grams per liter of electrolyte, and manganous sulfate ($MnSO_4$) having a concentration in the range of approximately 0.005 grams to approximately 0.1 grams per liter of electrolyte.

2. An electrolyte for a lead plate storage battery consisting essentially of an aqueous solution of selenic acid ($H_2SeO_4$) having a concentration of approximately 0.38 grams per liter of electrolyte, and ferrous sulfate ($FeSO_4$) having a concentration of approximately 0.8 grams per liter of electrolyte, and sodium chloride (NaCl) having a concentration of approximately 0.45 grams per liter of electrolyte, and manganous sulfate ($MnSO_4$) having a concentration of approximately 0.01 grams per liter of electrolyte.

3. In a storage battery comprising a fluid containing case, a positive plate composed principally of lead peroxide and a negative plate composed principally of lead, a separating material to prevent contact between said positive and negative plates, and an electrolyte filling said case consisting essentially of an aqueous solution of selenic acid ($H_2SeO_4$) having a concentration of approximately 0.38 grams per liter of electrolyte, and ferrous sulfate ($FeSO_4$) having a concentration of approximately 0.8 grams per liter of electrolyte, and sodium chloride (NaCl) having a concentration of approximately 0.45 grams per liter of electrolyte, and manganous sulfate ($MnSO_4$) having a concentration of approximately 0.01 grams per liter of electrolyte.

* * * * *